United States Patent [19]

Videm et al.

[11] 3,909,370

[45] Sept. 30, 1975

[54] PROCESS FOR SURFACE TREATMENT OF ZIRCONIUM-CONTAINING CLADDING MATERIALS FOR FUEL ELEMENTS OR OTHER COMPONENTS FOR NUCLEAR REACTORS

[75] Inventors: Ketil G. Videm; Liv R. Lunde; Henk H. Kooyman, all of Kjeller, Norway

[73] Assignee: Institutt for Atomenergi, Kjeller, Norway

[22] Filed: Nov. 30, 1972

[21] Appl. No.: 310,787

Related U.S. Application Data

[63] Continuation of Ser. No. 52,759, July 6, 1970.

[52] U.S. Cl. ............................. 204/32 R; 204/38 A
[51] Int. Cl. ............................................. C25d 5/34
[58] Field of Search ............... 204/38 A, 56 R, 32 R

[56] References Cited
UNITED STATES PATENTS

| | | | |
|---|---|---|---|
| 3,180,807 | 4/1965 | Quinn | 204/56 R |
| 3,198,718 | 8/1965 | Quinn | 204/56 R |
| 3,234,111 | 2/1966 | Sietnieks | 204/56 R |
| 3,279,030 | 10/1966 | Wagner et al. | 204/32 R |

OTHER PUBLICATIONS

"Anodizing as a Means of Evaluating the Corrosion Resistance of Zr and Zr Alloys" by R. D. Misch, Argonne Natl. Lab. report ANL–5229, 1955, p. 7.
"Anodic Oxidation of Al, Cr, Hf, Nb, Ta, Ti, V, Zr at Very Low Current Densities" by H. A. Johansen et al., J. Electrochemical Soc., V104, 1957, pp. 339–340.

Primary Examiner—R. L. Andrews

[57] ABSTRACT

A process for the surface treatment of zirconium-base cladding materials for fuel elements or other components for nuclear reactors, wherein the treatment includes pickling said cladding material in a fluoride-containing bath, and thereafter applying a protective coating through oxidation to the pickled cladding material whereby the fluoride-containing contaminents which remain on the surface of the cladding material during pickling are removed or rendered harmless by anodic oxidation.

5 Claims, No Drawings

PROCESS FOR SURFACE TREATMENT OF ZIRCONIUM-CONTAINING CLADDING MATERIALS FOR FUEL ELEMENTS OR OTHER COMPONENTS FOR NUCLEAR REACTORS

This is a continuation of copending application Ser. No. 52,759, filed July 6, 1970.

The present invention relates to an improved process for surface treatment of zirconium-base cladding materials for fuel elements or other components for nuclear reactors, wherein the treatment comprises an oxidation stage for the application of a protective coating subsequent to a preceding pickling in a fluoride containing bath.

The characteristic feature of the process is that fluoride-base contaminants, which remain on the surface of the material after the pickling, are removed or rendered harmless (the harmful effect is counteracted or eliminated) by anodic oxidation.

The oxidation stage may be carried out by treatment with water or steam under pressure and at high temperature, or by thermal oxidation in oxygen gas, or preferably by anodic oxidation.

When the application of the protective coating is effected by anodic oxidation, the removal and rendering harmless of the fluoride-containing contaminants as well as the oxidation for the application of a protective coating may be carried out in one step.

The application of the protective coating is preferably effected by subjecting the surface to anodic oxidation at a temperature of not more than 100°C in a bath which is agitated and which contains 0.01-0.5 molar solutions of alkaline electrolytes, preferably 0.1-2.0 per cent by weight of KOH in water, using a bath voltage which is increased at a rate of not more than 10 V/s to a final voltage of at least 30 V which is maintained until the current is approximately constant.

Zirconium alloys have recently been taken into extensive use as a construction material, as for instance "Zircaloy-2" and "Zircaloy-4", which are used as cladding material for fuel elements for nuclear reactors.

Usually, the zirconium cladding for the fuel elements is subjected to a surface treatment which results in an oxide coating, and usually, the oxide treatment is effected by a treatment in an autoclave with water or steam at a high temperature and pressure, often 400°C and 100 atmospheres, or by heating in oxygen.

Prior to the oxidation, the surface must be cleaned. The usual cleaning includes pickling in a mixture of nitric acid, hydrofluoric acid and water. A suitable pickling bath is for instance $HNO_3$—$HF$—$H_2O$ in a weight ratio of 41-4-55. Sometimes, a water-soluble fluoride such as $NH_4F$ is used instead of hydro-fluoric acid.

Even if the pickling is followed by a thorough flushing in water, the surface may easily be contaminated and stained with fluoride compounds which destroy the corrosion properties at high temperature. When such fluoride-contaminated pickling stains have been formed, there is no satisfactory chemical method of removing them. However, a satisfactory pickling bath for zirconium material, which does not contain fluoride compounds, has not been developed. Mechanical cleaning, for instance sand-blasting, has been used, but the necessary purity and finish of the surface have been difficult to obtain. Thus, use has often been made of fluoride-containing pickling baths, but it has been sought to decrease the amount of fluoride-contaminants by effecting a flushing in water as soon as possible after the pickling. A usual prescription is that the flushing is to be effected no more than 5 seconds after the pickling. In practice, this is often difficult to fulfill.

An advantage of the present method is that the operator will have more time when he transfers the pickled articles from the pickling bath to the flushing bath. When treating a great number of elongated and fragile articles, this is an essential advantage. Moreover, in the previously used methods, one could never insure sufficient freedom from fluoride-contaminants, even when the flushing was effected immediately. The principal advantage of the present method is accordingly that it removes or renders harmless the fluoride compounds, which compounds otherwise would result in a drastically increased corrosion rate. When the degree of fluoride-contamination is large, the present method gives an indication whether the surface of the treated article is contaminated, as the interference colours are stained. However, it has been proved by corrosion tests that these articles, after anodising, corrode with the same rate as specimens which have not been contaminated.

Surface treatment of zirconium or zirconium alloys is mostly effected in connection with manufacturing of fuel elements for nuclear reactors. Simplified, the fuel elements are prepared by filling tubes of zirconium material with nuclear fuel, usually $UO_2$, whereupon the tubes are closed by welding, and a number of closed tubes are assembled to fuel elements. Both the empty tubes, the closed tubes and the assembled fuel elements may be subjected to surface treatment.

The article which is to be surface treated by the present method is at first cleaned by pickling in an aqueous bath containing hydrofluoric acid or a water soluble fluoride, and preferably nitric acid. Then the article is flushed in water and placed into an anodising bath. The article is connected as the anode to a direct current source. The connector metal should consist of the same metal as the anode.

The cathode may for instance be platinum, the other platinum metals, or alloys of the platinum metals. The anodising treatment is not markedly dependent on the dimensions, configuration and placing of the cathode, as resistance is created in the oxide layer, which prevents further current passage through the oxide layer as long as any portions of the metal surface have not been oxidised. Even if the cathode is small and asymmetrically placed relative to the anode, the surface treatment will be uniform. The electrolyte should be agitated, as otherwise, gas will be accumulated on the surface of the article. The gas layer will insulate the article from the electrolyte and may result in a non-uniform treatment. It is also important that the fluoride which is removed from the surface be distributed in the electrolyte by the agitation.

After having removed or rendered harmless the fluoride-contaminants, the article may be provided with a protective oxide coating by treatments in an autoclave with water at high temperature and pressure, for instance 400°C and 100 atmospheres, or by thermal oxidation in oxygen. However, the most simple process would be to let the application of the protective coating be effected by anodic oxidation. The oxidation and removal or rendering harmless of the fluoride-contaminants will then proceed simultaneously. However, in order to obtain a satisfactory oxide film, the conditions must be much more rigorously maintained with respect to the choice of electrolyte composition and operating conditions, than when the purpose of the anodic oxidation is merely to remove or render harmless the fluoride-contaminants. If the oxidation stage is to be carried out as an anodic oxidation, the fluoride contaminants may either be removed or rendered harmless in a first electrolysis bath and the oxidation may be then completed in a second bath, or such bath composition and operative conditions may be selected such that both processes may be effected in the same stage.

Anodic oxidation of zirconium material has been effected in $HNO_3$, $HCl$, $H_2SO_4$, $H_3PO_4$, $HCOOH$, $CH_3COOH$, $NaNo_3$, $K_2Cr_2O_7$, $HCrO_4$, tartaric acid and $KOH$. By using dilute $KOH$ it is possible to obtain a coating on zirconium which seems to give just as good corrosion protection as that obtained by autoclave treatment, provided that the following conditions are maintained:

The oxidation should be carried out at temperatures below 100°C in an agitated bath preferably containing 0.1-2.00 percent of weight of KOH in water, and at a bath voltage which is increased by at most 10 V/s to a final voltage of at least 30 V which is maintained until the current is essentially constant.

By varying the conditions, layers of different colors may be obtained on the surface treated articles. This is an interesting observation, as such different colors make it easy to identify and mark the articles during their manufacture and later, for instance to mark fuel rods for nuclear reactors having different degrees of enriched fuel.

An advantage of the present method is that a more simple, lesser time-consuming and cheaper surface treatment may be achieved than with autoclave treatment. A 2000 A oxidised film formed by anodic oxidation is equally insensitive against contamination during usual handling and storing as a 10,000 A film formed by autoclave treatment. Impurities in the surface, such as pickling stains, finger marks etc. may be detected just as well by anodic oxidation as by autoclave treatment.

Another advantage is that the anodic oxidation proceeds by development of oxygen at the anode, so that no hydrogen will be introduced in the zirconium material. Because of hydrogen embrittlement, it is important to keep the hydrogen content of the material as low as possible.

A further advantage is that the anodic oxidation, contrary to autoclave treatment, does not result in increased corrosion rate under irradiation. The reason is that the defect-structure of the oxide is different in these two cases.

Experimental surface treatment of a series of zirconium alloys have been carried out, and most of them with "Zircaloy-2" and "Zircaloy-4". In some of the tests, however, parallel tests with other zirconium alloys have been performed. It seems that the alloy composition has no effect upon the removal of fluoride from the surface. However, it has been shown that the thickness of the applied oxide coating is somewhat different for the different alloys under identical anodising conditions. The following alloys have been tried with positive results:

"Zircaloy-2" with 1.54% Sn, 0.13% Fe, 0.09% Cr, 0.05% Ni, balance Zr.

"Zircaloy-4" with 1.52% Sn, 0.20% Fe, 0.09% Cr, 0.006% Ni, balance Zr.

1.0% Cr, 0.16% Fe, balance Zr.
2.5% Nb, 0.5% Ta, balance Zr.
0.7% V, 0.75% Fe, balance Zr.
1.2% Cu, 0.3% Fe, balance Zr.
0.2% Sn, 0.09% Fe, 0.07% Ni, 0.14% Nb, balance Zr.

The percentages are in percent by weight.

The invention will now be more closely described in the following illustrative examples.

EXAMPLE 1

"Zircaloy-2" specimens were surface-contaminated with fluoride in the following way: The specimens were pickled in a pickling bath consisting of $HNO_3$-$HF$-$H_2O$ in weight ratio of 41-4-55 for 3 minutes. The temperature of the pickling bath was 33°C. The specimens were then removed from the pickling bath and maintained in air for 20 minutes without removing attached pickling liquid. During this period, insoluble oxy- and hydroxy-fluorides were formed on the surface of the specimens. The specimens were thereafter thoroughly washed and dried.

Said fluoride-contaminated specimens were subjected to anodic oxidation in different electrolytes. Basic, neutral and acid aqueous solutions were tried. The different electrolytes which were tried are tabulated in Table 1. It is seen from the Table that the electrolytes contained 0,5–3 percent of a salt, an acid or a base. During all tests, the temperature of the electrolyte was ca. 20°C.

The anodising was effected in the same way in all the electrolytes. The specimens were connected as the anode in a direct current circuit, and the connector material was "Zircaloy-2". The cathode was prepared from platinum. A flow of current was established across the bath, and the voltage was increased at a rate of 5 V/s from 0 to 125 V. When the final voltage was reached, this voltage was kept constant for ca. 1 minute and the current passage was at that time approximately constant. The specimens were removed from the circuit, flushed in water and dried.

The specimens were then, together with reference specimens, corrosion tested in superheated steam at 400°C and 50 kp/cm$^2$ pressure for 4 days. The appearance after the anodising and corrosion test, as well as the weight gain, appear from Table 1.

Pursuant to American Society for Testing materials, Specification 353-64T for zirconium alloys, "Zircaloy-2" and "Zircaloy-4" are subjected to a corrosion test in steam at 400°C. After such exposure, the material shall have a uniform black, lustrous oxide film, free from both white and brown corrosion products. The weight gain shall be less than 22 mg/dm$^2$. According to said Specification, the fluoride contaminated, non-anodised specimens do not pass the test, and also some of the anodised specimens.

It appears from the Table that a satisfactory appearance combined with the lowest corrosion attack was obtained in the following electrolytes:

3% ammonium tartrate + $NH_3$ to pH 10
0.5% $NH_4OH$
0.5% LiOH
0.5% NaOH
1% ethylene diamine tetraacetate 1% + $NH_3$ to pH 11
3% $NH_4$-citrate + $NH_3$ to pH 10
0.5% KOH Somewhat stronger corrosion attack was determined for anodising in $NaNO_2$, whereas $LiNO_3$ and $KNO_3$ gave oxide films without satisfactory appearance, but with relatively low weight gain under the exposure to superheated steam.

Borate electrolytes seem to be somewhat inferior, whereas for instance sulphates, sulphides, carbonates and phosphates are not useable for the removal of fluoride-contaminants. It does not seem that the cation has any influence upon the course of the process, apart from the fact that the solubility of fluoride ions in solutions of $Ba^{++}$ and $Ca^{++}$ is very low at low temperature.

also analysed for the content of fluoride. In the electrolyte it was found $2.0 \cdot 10^{-5}$ mol $F^-$, whereas the fluoride concentration in the fresh solution was lower than the detection limit for the analysis method which is $3.5 \cdot 10^{-6}$ mol $F^-$. The determined fluoride content corresponded to that 14 $\mu$g F per $cm^2$ had been removed from the test surface.

All the specimens were corrosion tested in steam at 400°C, and again it was ascertained that the anodised specimens obtained a uniform, black oxide, whereas the non-anodised specimens were white-stained.

To investigate the ratio between the amount of fluo-

Table 1

Weight gain and appearance of anodised fluoride-contaminated specimens. The weight gain is determined as total weight gain after anodising and autoclave treatment, and is the average of two parallel tests.

| Electrolyte | pH | Appearance after anodising | Total weight gain after autoclave tests mg/dm² | Appearance after autoclave test |
|---|---|---|---|---|
| $NH_4$-tartrate 3% + $NH_3$ | 10 | Attr.* green | 15.0 | Attr. black |
| $LiNO_3$ 1% | 7 | grey-white | 16.6 | greyish, dull |
| $NH_4OH$ 0.5% | 13 | Attractive | 17.9 | attr. black |
| LiOH 0.5% | 13 | Attractive | 17.9 | attr. black |
| $KNO_3$ 1% | 7 | grey-white | 18.4 | greyish, dull |
| NaOH 0.5% | 13 | Attr. green | 18.8 | attr. black |
| Ethylenediamine-tetraacetate 1% + $NH_3$ | 11 | Attr. green | 18.8 | attr. black |
| $NH_4$-citrate 3% +$NH_3$ | 10 | Attr. green | 18.9 | attr. black |
| KOH 0.5% | 13 | Attr. green | 19.0 | attr. black |
| $NH_4$-citrate 3% | 5 | Attr. green | 21.4 | attr. black |
| $NaNO_2$ 1% | 8 | Attr. red-rose | 22.1 | attr. black |
| $NH_4$-tartrate 3% | 6 | Attr. light green | 24.9 | some white stains |
| $Na_2B_4O_7$ 1% | 10 | Attr. red-rose | 25.4 | attr. black |
| Citric acid | 1 | Attr. light green | 26.4 | attr. black |
| Tartaric acid 3% | 1 | Attr. light green | 27.5 | some white stains |
| $K_2CO_3$ 1% | 10 | Attr. green | 29.7 | some white stains |
| $Ca(OH)_2$ | 13 | Attr. green | 31.6 | attractive |
| $Ba(OH)_2$ | 14 | Attr. green | 31.8 | attractive |
| $Na_2HPO_4$ 2% | 7 | Attr. red-green | 33.7 | white-stained |
| $Na_3PO_4$ 1% | 9 | Attr. red-green | 44.0 | grey-white |
| $K_2SO_3$ 1% | 8 | Attr. light green | 46.5 | white |
| $K_2SO_4$ 1% | 7 | Attr. light green | 49.2 | white |
| $H_2SO_4$ 1% | 1 | Attr. light green | 52.2 | white |
| $Na_2SO_4$ 1% | 7 | Attr. light green | 53.3 | white |
| Not anodised, flushed immediately after normal pickling | | | 20.0 | black |
| Not anodised, fluoride-contaminated. | | | 42.1 | white |

EXAMPLE 2

Specimens of "Zircaloy-2" were surface treated with fluoride as described above. The temperature of the pickling bath was 35°C and the residence period in air was 20 minutes. The specimens were this time washed extra thoroughly, so that all fluoride, which was not chemically bound to the surface, was removed.

The specimens were then anodised in a basic electrolyte (0.5% KOH) in the same way as previously reported. The reference specimens were not anodised. The used electrolyte, as well as the fresh solution, were ride on the surface of zirconium alloys and the degree of white oxide formed in standard corrosion tests (400°C, steam), the following experiment was conducted:

Drops of an aqueous solution of HF were distributed on a surface of "Zircaloy-2" with 1 $cm^2$ surface area. The drops had a volume of 0.05 ml and a fluoride content adapted to give a surface contamination of fluoride of from 0.5–200 $\mu g/cm^2$.

A set of specimens were placed in an autoclave in steam at 400°C and 50 kp/$cm^2$ for 2 days. It was found that traces of white oxide (the reject limit according to ASTM-Specification 353/64T) were formed at ca. 5 µg/cm², in correspondence with Rynasiewiez (USA EC Report KAPL-2000-19, Reactor Technology, Report No. 22 - Chemistry, J. Rynasiewiez, 1962), which reports that 8.5–17 µg F/cm² is necessary for a fairly uniform white oxide.

It was further found, by comparison of appearance, that the standard test method which was used to prepare fluoride-contaminated surfaces in Example 1 gave ca. 10–20 µg F/cm².

When these figures are compared with the amount of fluoride found in the electrolyte, the conclusion may be drawn that fluoride is removed from the surface during anodising and that the removed amount is of the same order of magnitude as the total fluoride amount, which gave white oxide on the non-anodised reference specimens.

EXAMPLE 3

To determine the voltage which is necessary to remove all fluoride from a specimen where the pickling solution was dried up on the surface, the following tests were conducted: The pickling liquid was the same as in Example 1 and the specimens were fluoride-contaminated by the same method. The amount of fluoride on the surfaces of the specimens was then prior to anodising ca. 10–20 µg F/cm².

The anodising solution was 0.5% KOH and the test material was "Zircaloy-4". The specimens were anodised so that the voltage was increased with the same velocity for all specimens, to a desired final voltage which was varied from 6.4 to 100 V. When the desired final voltage had been reached, it was maintained constant for two minutes before the current was cut out. The anodized specimens were subsequently autoclaved for 3 days in steam at 400°C and 50 kp/cm².

The anodising voltage, weight gain during anodising and autoclave treatment as well as appearance after autoclaving are reported in Table 2.

After autoclaving, there was a marked difference in the appearance of the specimens. The specimens which had been anodised at 30 V and below were all alike and uniformly grey-white, whereas all the specimens anodised at 50 V and higher had a black, lustrous appearance. There was no uniform transition from grey to black, but a quite marked distinction between 30 and 50 V. From the total weight gain it may be seen that the specimens anodised at 30 V and below cannot be accepted, whereas the specimens anodised at voltages higher than 50 V are within the ASTM-prescriptions.

Table 2

Appearance and weight gain after autoclaving of fluoride-contaminated "Zircaloy-4" specimens after anodising to various voltages.

| Final Voltage V | Weight gain µg/dm² | | | Appearance after autoclaving |
|---|---|---|---|---|
| | during anodising | during autoclaving | total | |
| 6,4 | 0,2 | 34,3 | 34,5 | grey-white |
| 8 | 0,3 | 33,3 | 33,6 | '' |
| 10 | 0,5 | 32,3 | 32,8 | '' |
| 15 | 0,8 | 29,8 | 30,6 | '' |
| 20 | 1,0 | 29,8 | 30,8 | '' |
| 30 | 1,6 | 23,1 | 24,7 | '' |
| 50 | 2,7 | 18,0 | 20,7 | black |
| 75 | 4,2 | 16,8 | 21,0 | '' |
| 100 no fluoride contaminants | 5,7 | 13,1 | 18,8 | '' |

Table 2-Continued

Appearance and weight gain after autoclaving of fluoride-contaminated "Zircaloy-4" specimens after anodising to various voltages.

| Final Voltage V | Weight gain µg/dm² | | | Appearance after autoclaving |
|---|---|---|---|---|
| | during anodising | during autoclaving | total | |
| 125 | 7 | 10,7 | 17,7 | black |
| fluoride contaminated (not anodised) | — | — | — | grey-white |

EXAMPLE 4

Specimens of "Zircaloy-2" were fluoride-contaminated by drops as described in Example 2. The concentration on the surface was 10 µg F/cm².

A set of specimens were anodised in 0.5% NaOH to different final voltages (30, 50, 70 and 90 V) at 0°C, and another set of specimens were anodised in the same electrolyte to the same voltages, but at 100°C.

Specimens anodised to the same voltages obtained different interference colours at 0°C than at 100°C, which indicates that a thicker oxide layer is formed at 100°C than at 0°C.

After autoclave testing (3 days in steam at 400°C, 50 kp/cm²), any essential difference could not be determined in the two set of specimens as to the removal of fluoride. The specimens anodised at the three highest voltages were black and quite alike. By anodising at the lowest voltage the specimens anodised at 100°C were somewhat better than the specimens anodised at 0°C. The temperature of the anodising bath has, accordingly, so low effect on the ability to remove fluoride that any temperature, at which the electrolyte is liquid, may be used. For pratical reasons, room temperature will for most cases be preferred. By anodising in electrolytes made from for instance the sparingly soluble hydroxides as for instance Ba(OH)₂, the ability to remove fluoride may be improved at higher temperatures because of the increase in solubility.

EXAMPLE 5

"Zircaloy-4" specimens were surface treated with fluoride in the same way as in Example 1. The residence period in air before subsequent flushing was this time 5 and 15 minutes, respectively. Reference specimens were flushed immediately after the pickling. Some of the specimens were anodised in a basic electrolyte. The anodising was carried out in the same way as previously described. The electrolyte consisted of an aqueous solution of KOH (0.5%) and the final voltage was 125 V. All the specimens were thereafter tested in water and steam at 230°C. The results are given in Table 3.

It may be seen that increasing degree of fluoride-contamination increased the corrosion rate for the non-anodised specimens, and the corrosion rate is far higher than for an anodised specimen. The oxide of the specimens was grey-white and stained. All the anodised specimens had the same low weight gain during autoclaving, independent of the degree of the original fluoride-contamination.

The specimens with the shortest residence time in air (5 min.) received after anodising a quite uniform red-green colour, and were after autoclaving uniformly black with a shade of red-green. The specimens with a longer residence time (30 min.), i.e. with higher fluoride-contamination, obtained after anodising stains, areas with pure green colour and other areas with pure red colour. These stains could also be seen in the black oxide, but there were no white or grey shades, which could indicate abnormal oxide.

When the fluoride-contamination exceeds a certain limit, it may then through anodising be proved that an article has been fluoride-contaminated.

The weight gain during the subsequent corrosion testing proved that the originally differently fluoride-contaminated specimens had the same corrosion rate after anodising. If any remaining fluoride was present on the specimens, these amounts had after anodising to be the same on the two sets of specimens, and the amount had to be just as little or less than on a specimen which after pickling immediately had been subjected to flushing.

conducted. The specimens were oxidised in oxygen for 24 hours at 350°C. The specimens received thereby an oxide layer, which had the same thickness as the anodised specimens in Example 1, ca. 5000 A.

The specimens were then corrosion tested at 400°C. The corrosion testing showed that thermal oxidation had not improved the corrosion properties of the specimens, as these specimens had as high weight gain as the un-treated fluoride-contaminated specimens, and the surface of the specimens was white and stained. Thus, thermal oxidation cannot replace anodising for removal of fluoride contaminants.

EXAMPLE 8

Three sets of tubular specimens of "Zircaloy-2" were pickled in the same pickling bath as mentioned above. The specimens were after the pickling maintained in air for varied periods (1 sec.–10 min.) before they were thoroughly washed and thereafter dried. One set of Table 3

Weight gain of "Zircaloy-2" during corrosion testing in water and steam under pressure at 230°C.

| Residence time in air after pickling | Anodising | Autoclave atmosphere | Total weight gain mg/dm² | | Appearance |
|---|---|---|---|---|---|
| | | | 10 days | 30 days | |
| 2 sec. | no | water | 5,5 | 6,6 | black |
| 5 min. | yes | steam | 7.*) | 7+0,1 | " |
| 5 min. | yes | water | 7.*) | 7+0,1 | " |
| 30 min. | yes | steam | 7.*) | 7+0,1 | black,stained |
| 30 min. | yes | water | 7.*) | 7+0,1 | " |
| 5 min. | no | steam | 5,8 | 7,8 | stained, grey-white |
| 5 min. | no | water | 5,2 | 10,4 | " |
| 30 min. | no | steam | 7,1 | 11,7 | " |
| 30 min. | no | water | 9,5 | 21,4 | " |

*)the anodised specimens, did not increase in weight during the first test period, the weight gain of 7 mg/dm² was obtained during the anodising.

EXAMPLE 6

To determine the detection limit for fluoride, specimens were contaminated with fluoride amounts of 0.5-10-25-50-100-200 mg/cm² by using the same technique as described in Example 2. The specimens were thereafter anodised in NaOH at pH 14 to a final voltage of 125 V and thereafter autoclaved in steam at 400°C and 50 kp/cm². Reference specimens were autoclaved directly without preceding anodising. It was found that a concentration of ca. 5 µg F/cm², and higher results in colour stains during anodising. The exact detection limit is not known, but is presumably lower, as traces of difference could be seen at 0,5 µg F/cm².

After autoclaving, the non-anodised specimen with a concentration of 5 µg F/cm² was slightly grey, whereas the specimen with 0,5 µg F/cm² was uniform black.

It was further found that fluoride-contaminants may be removed from the surface for fluoride contamination with concentrations up to 50 µg F/cm². At higher concentrations, the specimens cannot be subjected to anodising, the fluoride contaminants remain on the surface and severe corrosion occurs during autoclave testing. However, this limit is higher than the contamination which might result even if pickling liquid is dried up on the surface.

EXAMPLE 7

To examine whether any oxidation would remove fluoride-contaminants, oxidation in oxygen was also specimens was subjected to anodic oxidation. The electrolyte was basic (0.5% KOH) and the final voltage 125 V. The remaining two sets of specimens were oxidised by superheated steam, temperature 400°C and pressure 100 and 25 kp/cm², respectively, for 3 days. All the specimens were then corrosion tested in steam at 400°C for 30 days. The non-anodised specimens were white-stained and showed high weight gain, whereas the anodised specimens received a uniform, black oxide with low corrosion rate, which indicates that the fluoride-contaminants are removed or rendered harmless prior to the exposure to steam. The anodised specimens showed also after a long testing period (150 days) a uniform, low corrosion rate, whereas the autoclaved specimens corroded with increasing velocity.

EXAMPLE 9

To a 0.5% solution of NaOH was added fluoride in the following amounts: 4, 8, 21, 42, 210 and 420 ppm. Specimens were anodised in the solutions and then autoclaved. It turned out that the anodising proceeded normally in solutions which contained up to 210 ppm F, whereas 420 ppm in the anodising solution influenced the process, and the formed oxide resulted in a high corrosion rate during the subsequent autoclaving.

Consequently, for a fluoride contamination as high as 10–20 µg F/cm² pr. liter electrolyte, anodising may be carried out without any damage to the anodising process from the amount of fluoride in the solution.

EXAMPLE 10

For the purpose of further elucidating the process, an example pertaining to the treatment of a fluoride-contaminated article is given, the article being firstly anodised to a certain voltage to remove the fluoride which is bound to the surface, and the article is then further anodised to a higher voltage with the intention of forming a corrosion and handling protective coating.

A tubular anode of "Zircaloy-2" with plus welded into both ends was used.

The tube was pickled in a pickling liquid consisting of HF-HNO$_3$-H$_2$O in a weight ratio of 4-41-55. The temperature of the pickling bath was 34°C and the pickling period was 3 min. After the pickling, the tube was maintained in air with the pickling liquid drying for 10 min. prior to the tube being thoroughly flushed an dried.

A bath containing 5 g NaOH per liter was prepared. The temperature of the bath was 19°C and the liquid was circulated by an agitator with motor.

The length of the tube was 60 cm and its effective surface was 290 cm$^2$. The cathode consisted of platinum, a 2 mm $\phi$ wire, which was placed adjacent the anode for its whole length, and its effective surface was 36 cm$^2$.

The electrode was connected to a direct current source and the voltage was increased with a velocity of 5 V/sec. to a final voltage of 60 V. The voltage was kept constant for 2 min. The anode was then red-violet with slightly rose stains, which indicated that the anode had been fluoride-contaminated.

The voltage was then increased slowly with a velocity of 2 V/s from 60 to 125 V. The final voltage was maintained constant for 2 minutes, and the current density was then approximately constant 0,3 A/dm$^2$. The current was shut off and the article was removed, flushed in cold water and washed.

The thickness of the oxide was by this process increased from 2000 A to 4400 A, and the article is thereby better protected against handling damages, and at the same time, an oxidation process has been initiated, which secures normal, low corrosion rate when using the article in water and steam of high temperature.

We claim:

1. A method for surface treatment of zirconium to produce a protective coating thereon, said method consisting of:

cleaning said zirconium by submersing the same in a pickling bath containing fluoride ions;

removing said zirconium from the pickling bath and then while still contaminated with fluoride containing residues, subjecting the same to anodic oxidation in the absence of additional fluoride ions until said fluoride containing residues are rendered incapable of interfering with the subsequent oxidation of said zirconium to produce a protective oxide coating thereon; and thereafter producing a protective oxide coating on the clean zirconium by subjecting the same to surface oxidation conditions.

2. A method as set forth in claim 1 wherein the protective oxide coating is produced by anodic oxidation.

3. A method as set forth in claim 2 wherein said anodic oxidations are both carried out in the same bath.

4. A method as set forth in claim 3 wherein the anodic oxidations are both carried out in the same stirred bath containing a 0.01 to 0.5 molar aqueous solution of an alkaline electrolyte at a temperature below 100°F, the voltage applied to said bath being increased at a rate of not more than 10 volts per second until a final voltage of at least 30 volts is attained, said final voltage being maintained at a constant level until the current through said bath is constant.

5. A method as set forth in claim 4 wherein the solution in said stirred bath contains 0.1 to 2.0 percent by weight of KOH.

* * * * *